United States Patent [19]

Wagstaff et al.

[11] 4,250,896
[45] Feb. 17, 1981

[54] ANTI-WRAP MEANS

[75] Inventors: Robert A. Wagstaff; Steven J. Campbell, both of New Holland; Mark L. Cozine, East Earl, all of Pa.; Marc Christenson, Boring, Oreg.; Ray E. Nooyen, Leola, Pa.

[73] Assignee: Sperry Corporation, New Holland, Pa.

[21] Appl. No.: 47,386

[22] Filed: Jun. 11, 1979

[51] Int. Cl.³ .............................................. A01F 12/18
[52] U.S. Cl. .................................................. 130/27 T
[58] Field of Search ........................... 130/27 T, 27 R; 56/14.6

[56] References Cited

U.S. PATENT DOCUMENTS

| | | | |
|---|---|---|---|
| 3,464,419 | 9/1969 | Knapp et al. | 130/27 T |
| 3,626,472 | 12/1971 | Rowland-Hill | 130/27 T |
| 3,742,686 | 7/1973 | Rowland-Hill | 130/27 T |
| 3,827,443 | 8/1974 | Drayer | 130/27 T |
| 3,828,794 | 8/1974 | Gochauour | 130/27 T |
| 3,995,645 | 12/1976 | Rowland-Hill | 130/27 T |

Primary Examiner—Jay N. Eskovitz
Attorney, Agent, or Firm—Ralph D'Alessandro; Frank A. Seemar

[57] ABSTRACT

In a crop harvesting and threshing machine of the type utilizing at least one axial flow threshing and separating rotor within a generally cylindrical elongate rotor casing there is provided an annular member fastened to a support member surrounding the front portion of the threshing rotor, a guide member fastened to the support member and contiguous with the annular member projecting linearly outwardly therefrom, a ramp section sloping rearwardly and outwardly affixed to the support member adjacent the guide member to direct the crop material from the guide member generally outwardly and upwardly towards the rear of the rotor casing into contact with a transport fin affixed to the top of the casing in an oblique angular relation therewith, thereby promoting the further rearward movement of crop material as it is transported axially about the threshing rotor.

8 Claims, 8 Drawing Figures

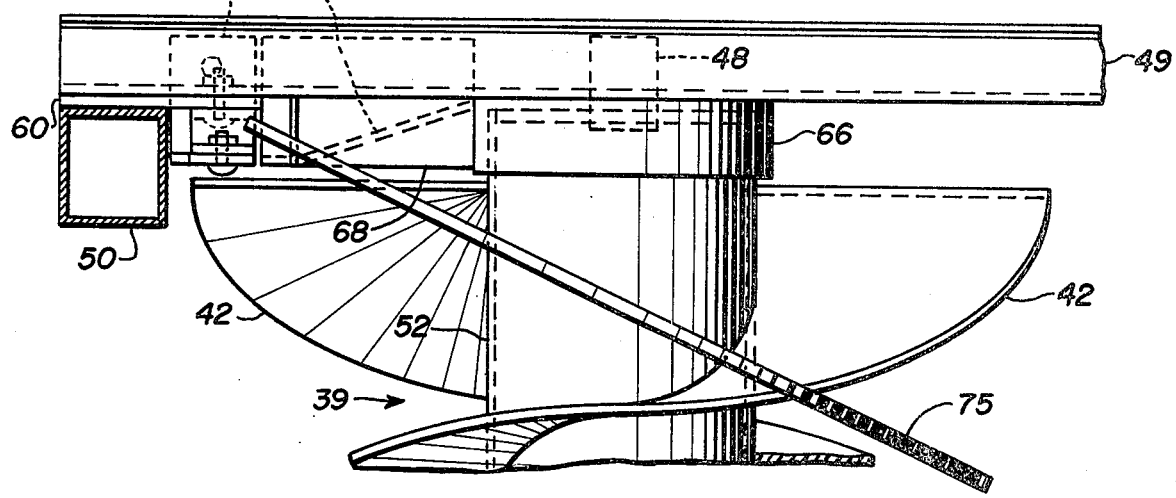
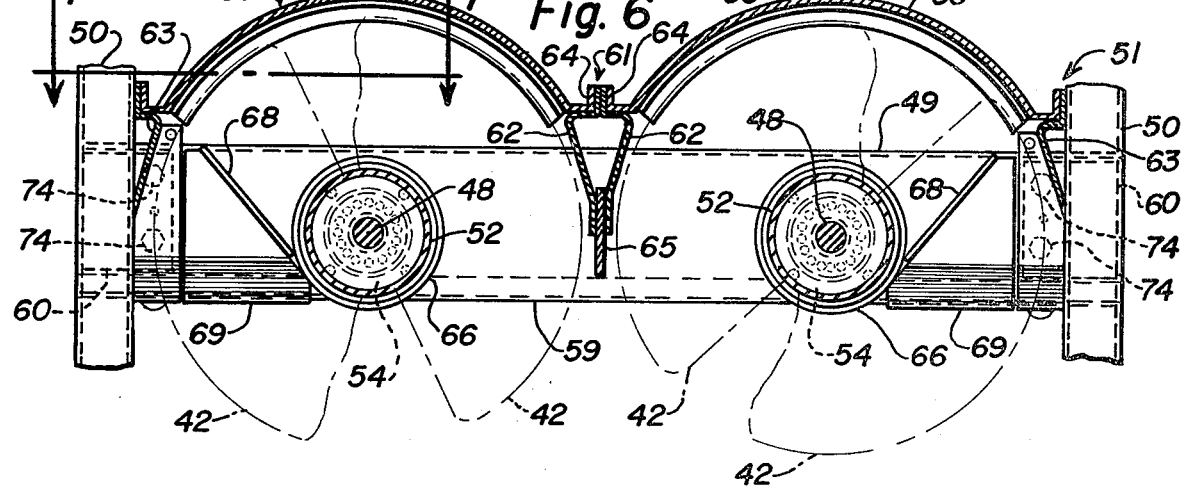
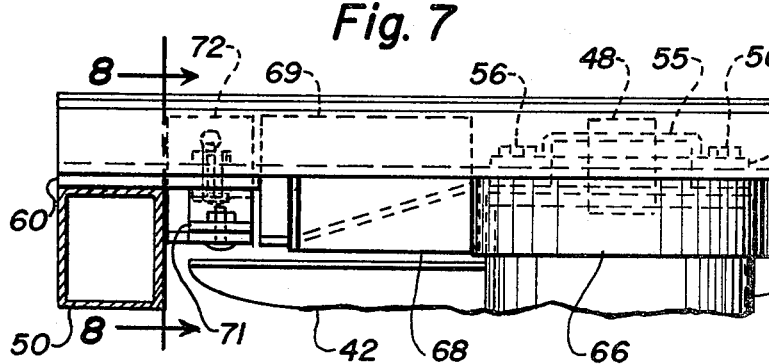
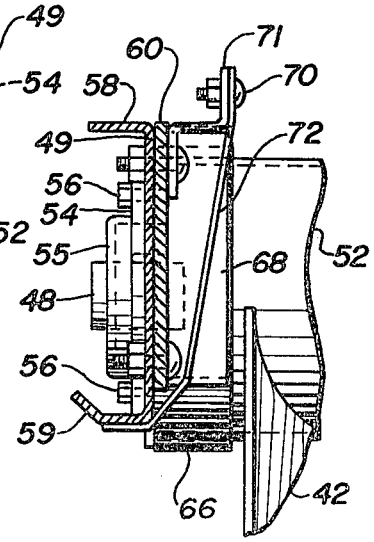

ANTI-WRAP MEANS

BACKGROUND OF THE INVENTION

This invention relates generally to crop harvesting and threshing machines, more commonly known as combines, and more particularly to the type of machine commonly referred to as an axial flow type of combine wherein the crop material passes axially through an elongate casing and about the threshing and separating rotor contained therein. Specifically, the invention is concerned with an improved anti-wrap means to prevent crop material from wrapping on the front shaft of the rotor adjacent the material infeed area of the casing. This invention is equally applicable to an axial flow type of combine utilizing either a single threshing and separating rotor or multiple threshing and separating rotors.

The conventional type of combines previously used pass the crop material to be threshed between a rotary cylinder and a stationary concave in a direction that is normal to the axis of the rotating cylinder and parallel with the longitudinal axis of the combine frame. In this system much of the grain contained in the crop material fed to the cylinder and the concave passes through the concave as threshed grain. The remainder of the material is conveyed to separating elements of the combine that traditionally include reciprocating or oscillating straw walkers, grain pans, and chaffer sieves. These conventional combines suffer from the major disadvantage of having a threshing capacity that is limited by the single pass of the crop material about the threshing cylinder. Combines of the axial flow type, in contrast, utilize single or dual threshing and separating rotors that permit the crop material to pass over the concave during the threshing process three or more times. The rotors may be mounted either parallel or transverse to the lontigudinal axis of the combine. This increased exposure to either the transversely or longitudinally mounted rotors during the threshing process permits these axial flow type of combines to increase the amount of threshed grain obtained from any crop passed therethrough when compared with conventional combines.

A feeder housing elevator on the front of the axial flow type of combine delivers the cut crop material to the front or infeed end of the threshing and separating rotors. In one variation of the type of combine in which the instant invention can be utilized there are two rotors of generally cylindrical configuration which have a short infeed auger mounted to each of their forward ends. The rotors turn in opposite directions in parallel housings within a combined rotor casing and have separate threshing and separating portions. The threshing portion of each rotor or threshing cylinder has as many as four rasp bars fastened thereto in closely mounted pairs. Open type of concaves are individually adjustable and sit beneath each rotor within the casing. The separating portion of the rotors have separator blades fixed to each of the two rotors to continue separating the grain from the crop material as the material moves rearwardly. The rearward movement of the crop material is aided by arcuate fins fixed to the upper portions of the rotor casing. At the rear of the rotors crop material is deflected into a transverse discharge beater and an auxiliary separating area which serve to remove the remaining grain and expel the crop material residue at the rear of the combine. These features are all shown in greater detail in prior U.S. Pat. Nos. 3,626,472, issued Dec. 7, 1971, and 3,742,686, issued July 3, 1973, both to Rowland-Hill.

When axial flow type of combines are used in certain long stemmed leguminous or grassy crops, such as windrowed perennial or annual rye grass, clover and bent grass, there is the potential for the crop material to wrap about the shafts on the front of the threshing and separating rotors, especially when the stems are tough. These long stems are characteristically tough in the early morning until the sun has had ample opportunity to dry out the moisture which accumulates overnight. Should such crop material pass over the tops of these rotor shafts, it could become tightly wrapped about the shafts so as to impair the operational characteristics of the overall machine. This operational impairment from the wrapping potentially could cause eventual damage to the operating components of the rotors by breaking the seals to the rotor bearings, cause engine stallouts by binding the rotors so tightly that they cannot turn, or, at the least, prove to be extremely difficult to untwine or disentangle.

Prior axial flow type of combines have recognized the problem that this wrapping can cause. One approach which has been taken to solve this problem involves the use of a casting that surrounds the rotor shaft and serves as a bearing housing as well as a shield for the bearing. The casting forms a central hub from which a shed bar projects radially outwardly in the form of a lobe to guide the crop material outwardly from the rotor shaft. The inherent disadvantages of this design include the relatively massive size of the shed bar, the relatively high cost of the casting and the associated shed bar and the fact that this casting/shed bar combination has the potential to build up a substantial amount of heat under tough crop conditions due to its size and the constant frictional contact of the crop material with it.

The foregoing problems are solved in the design of the machine comprising the present invention by conveying the crop material away from the centerlines of the shafts in each of the rotors back into the rotor infeed augers before the crop material passes over the shafts.

SUMMARY OF THE INVENTION

It is a principal object of the present invention to provide in a combine of the axial flow type improved anti-wrap means at the forwardmost portion of the threshing and separating rotor casing to prevent long stemmed crop material from wrapping on the front of the rotor shaft by conveying the incoming crop material into the rotor infeed auger before the material passes over the top of the rotor shaft.

It is a further object of the present invention to provide a simple, low cost mechanism that will preclude damage from occurring to the operating components of the threshing and separating rotors in an axial flow type of combine by preventing crop material from becoming wrapped about the rotating shaft at the front of the threshing and separating rotor.

It is a feature of the present invention that there is provided a transport fin which is affixed to the top of the rotor casing overlying the rotor infeed auger and cooperative with the anti-wrap means to help convey the crop material farther back into the rotor for threshing and separating.

It is an advantage of the present invention that little or no crop material passes over the rotor shaft during the infeed of material thereby making it less likely for material to wrap around the shaft.

It is another feature of the instant invention that the guide means used to convey the crop material away from the centerline of the rotor shaft back into the rotor augers is raised in design so that the leading edge of the infeed rotor auger in operation just clears the guide means' elevated surface, thereby minimizing the amount of crop material which can pass therebetween towards the rotor shaft.

It is a further feature of this invention that there is a ramp between the guide means and the combine side sheet which is sloped back at its top to clear the leading edge of the infeed rotor so as to guide the crop material rearward into the rotors.

It is another feature of the present invention that the forwardmost portion of the leading transport fin affixed to the top of the rotor casing is positioned forwardly of the rear edge of the ramp so as to collect the crop material which moves upwardly and rearwardly off the ramp and convey it back into the threshing and separating rotor before it passes over the rotor shaft.

These and other objects and advantages are obtained by providing apparatus in a crop harvesting and threshing machine of the type utilizing at least one axial flow threshing and separating rotor within a generally cylindrical elongate rotor casing, an annular member which is fastened to a support member and surrounds the front portion of the threshing rotor, a guide member fastened to the support member and contiguous with the annular member projecting linearly outwardly therefrom, a rearwardly sloping ramp section affixed to the support member adjacent the guide member to direct the crop material from the guide member generally outwardly and upwardly towards the rear of the rotor casing into contact with a transport fin affixed to the top of the casing in an oblique angular relation therewith, thereby promoting the further rearward movement of crop material as it is transported axially about the threshing rotor.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 5 is a top plan view of one of the threshing and separating rotors showing the interaction of the transport fin, the ramp means and the guide means;

FIG. 6 is a front elevation view taken along the line 6—6 of FIG. 1 showing the annular member, the guide member and the ramp means;

FIG. 7 is a top plan view showing the slope and the rearward displacement of the ramp means and its relation with the guide member taken along the line 7—7 of FIG. 6; and FIG. 8 is a side elevation view taken along the line 8—8 of FIG. 7 which shows the rearward slope of the ramp means.

DETAILED DESCRIPTION OF THE PREFERRED EMBODIMENT

Figure 1:
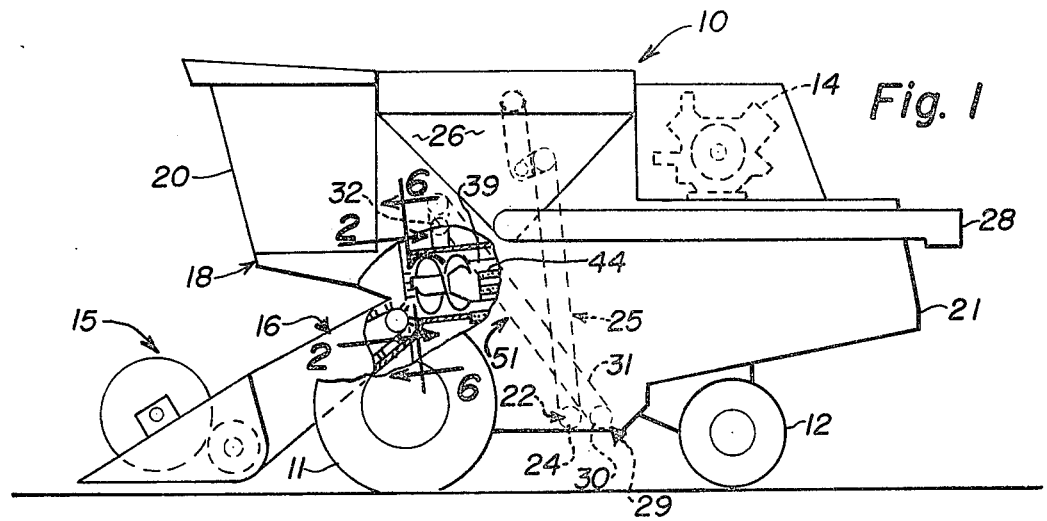
FIG. 1 is a side elevation view of a crop harvesting and threshing machine with portions broken away to show in section the infeed area of the threshing and separating rotors.

Referring to FIG. 1 there is shown a combine 10 in a side elevational view with the critical portions of the instant invention illustrated in fragmentary manner by having their side coverings cut away and further illustrated in a partially sectional view. As can be seen, the combine 10 has a mobile frame mounted to a pair of primary driving wheels 11 in the front and a pair of smaller steerable wheels 12 in the rear. The combine is powered by an engine 14, usually a diesel engine of relatively high horsepower. The engine 14 is mounted to the upper portion of the combine in a suitable fashion and, by means of drive belts or sprocket chains, is drivingly connected to the operational components of a combine.

The combine 10 has a header 15 and an infeed housing 16 mounted at its front. Combine 10 has a main frame or housing, indicated generally by the numeral 18, that internally supports the two threshing and separating rotors 39, only one of which is partially shown in FIG. 1. The operator's cab 20 extends forwardly over the front of the main frame 18 and is atop the infeed housing 16. A rear housing 21 encloses the rear of the combine 10 and covers the discharge beater and discharge grate assembly, both of which are not shown.

The main frame 18 also supports a grain pan and grain cleaning means, both of which are not shown. The grain pan collects the threshed and cleaned grain and transports it to a grain trough, indicated generally in FIG. 1 by the numeral 22, which spans the width of the combine along the bottom of the frame. The trough is open-topped and has an auger 24 rotatably mounted therein which conveys the clean grain to the grain transfer chute, indicated generally by the numeral 25, which conveys the grain generally vertically upwardly into the grain tank 26 for storage. When it is necessary to unload the full grain tank, an unloading auger (not shown) is pivotally mounted within an unloading auger tube 28 which is movable between inboard and outboard positions with respect to the longitudinal axis of a combine and is effective to discharge the threshed and cleaned grain from the grain tank to a receiving vehicle or container. FIG. 1 also shows a tailings collection trough, indicated generally by the numeral 29, which has an auger 30 mounted within spanning the width of the underside of the combine frame. The cleaning system within the combine is functional to take unthreshed grain which remains within the crop material, separate it from the clean grain and the chaff and direct it into this tailings trough 29. The tailings auger 30 then conveys the crop material with the unthreshed grain to a tailings return chute 31. Chute 31 extends generally upwardly from trough 29 where it connects with a generally horizontal tailings tube 32, best shown in FIG. 2.

Tailings tube 32 houses a conveying auger 34 which spirals about its main shaft 35. Tailings tube 32 has two openings which lead through channels 36 into the two elongate generally cylindrical rotor casings, each indicated generally by the numeral 38. The centrifugal force generated by the turning of the auger 34 and the force of gravity cause the tailings to fall from the tailings tube 32 through the channels 36 into the rotor casings 38 where they are brought into contact with the counter-rotating rotors, indicated by the numerals 39.

Figure 2:
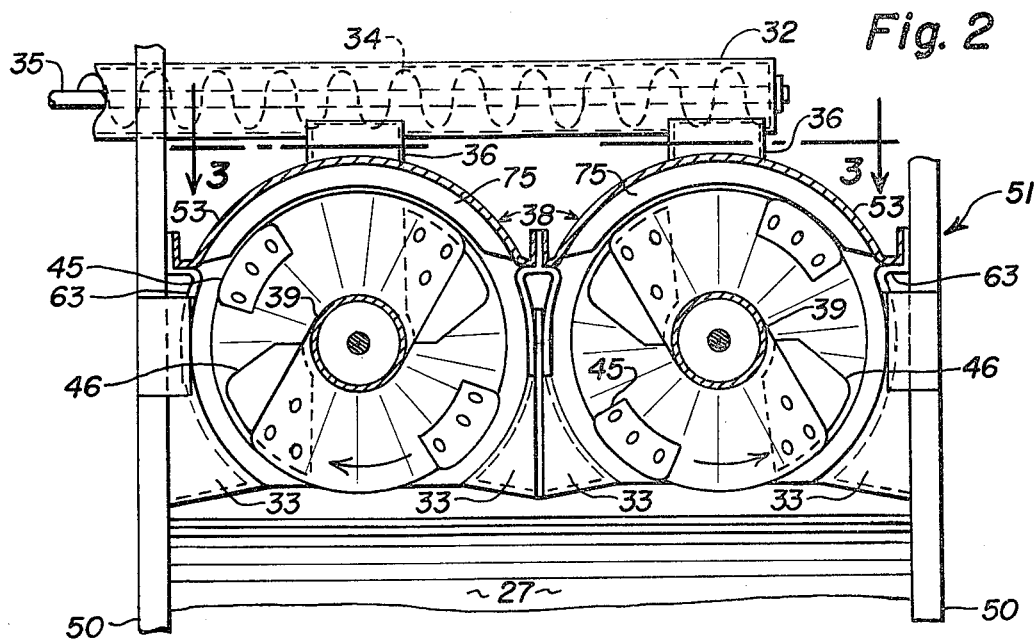
FIG. 2 is an end elevation view of a vertical section of the rotors and rotor casing taken along the line 2—2 of FIG. 1 showing the interaction of the rotor infeed augers and the transport fins.
Figure 3:
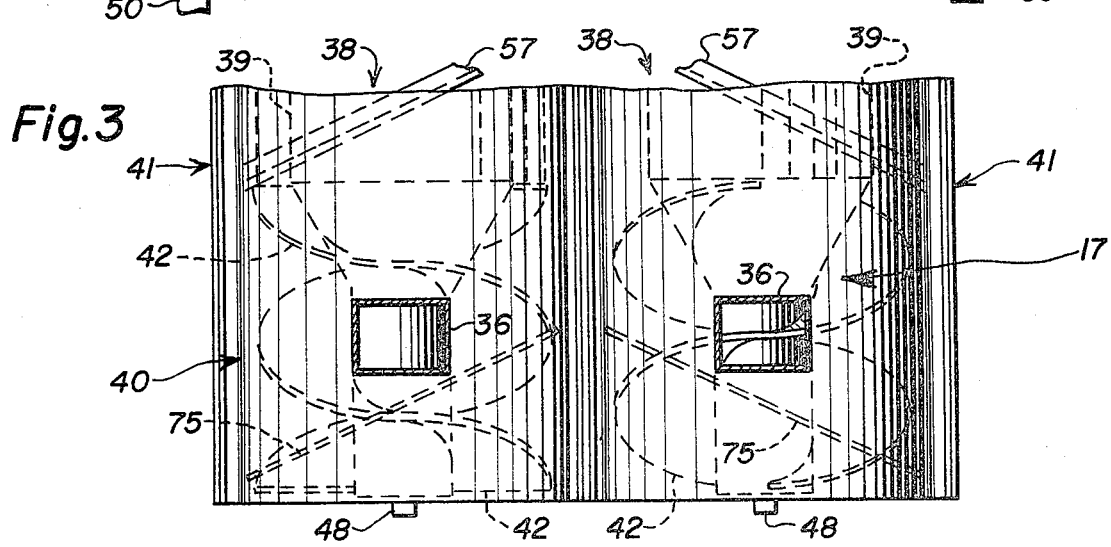
FIG. 3 is a top plan view of the rotors showing the infeed augers and the overlying transport fins taken along the line 3—3 of FIG. 2.

Both of the rotors 39 are enclosed in the individual elongate and generally cylindrical rotor casings partially illustrated in FIG. 3. Both the rotors 39 and the casings 38 are divided into infeed areas, indicated generally by the numerals 17 and 40, respectively, threshing areas, partially illustrated in FIG. 3 and indicated generally by the numeral 41, and separating areas (not shown). The infeed area 40 is in the forward portion of the rotor casing 38 adjacent the infeed housing 16, briefly seen in FIG. 1. The rotor 39 have a pair of auger flightings 42 spirally mounted thereabout in the rotor infeed area 17. The auger flighting 42 serves to deliver the stream of crop material brought from the header 15 through the infeed housing 16 by a crop elevator (not shown) rearwardly into contact with rasp bars 44 that are fastened to and generally define the threshing portions of the rotors 39. The rasp bars 44 are partially shown in FIG. 1. As shown in FIG. 2, the auger flighting 42 may have auger flighting extensions 45 and wear plates 46 bolted or otherwise appropriately fastened to the flighting's leading edges. These extensions and wear plates selectively increase the aggressiveness of the rotors 39 in the infeed area 17 and decrease wear to the fixed auger flighting 42 since they are detachable from the leading edges of the flighting. The rasp bars 44 cooperatively interact with the concaves (not shown), which are mounted generally beneath each of the cylindrically shaped rotors 39 in the lower portions of the elongated rotor casings 38, to receive and thresh the crop material spiralled rearwardly through the infeed area 40 by the auger flighting 42. The concaves are generally of the open type and concave in shape to permit shelled or threshed crop material to pass therethrough. The shelled or threshed crop material is then received upon the previously mentioned grain pan (not shown), which functions in a conventional manner to permit the grain or other crop material to be sifted and then collected in the clean grain trough 22 for ultimate transfer to the grain tank 26.

The structure thus far has been described generally since it is old and well known in the art. This structure and the interrelationships between the various operating components of the combine are described in greater detail in U.S. Pat. Nos. 3,626,472, issued Dec. 7, 1971; 3,742,686, issued July 3, 1973; and 3,995,645, issued Dec. 7, 1976; all to Rowland-Hill, hereinafter specifically incorporated by reference in their entirety, insofar as they are consistent with the instant disclosure.

Figure 4:
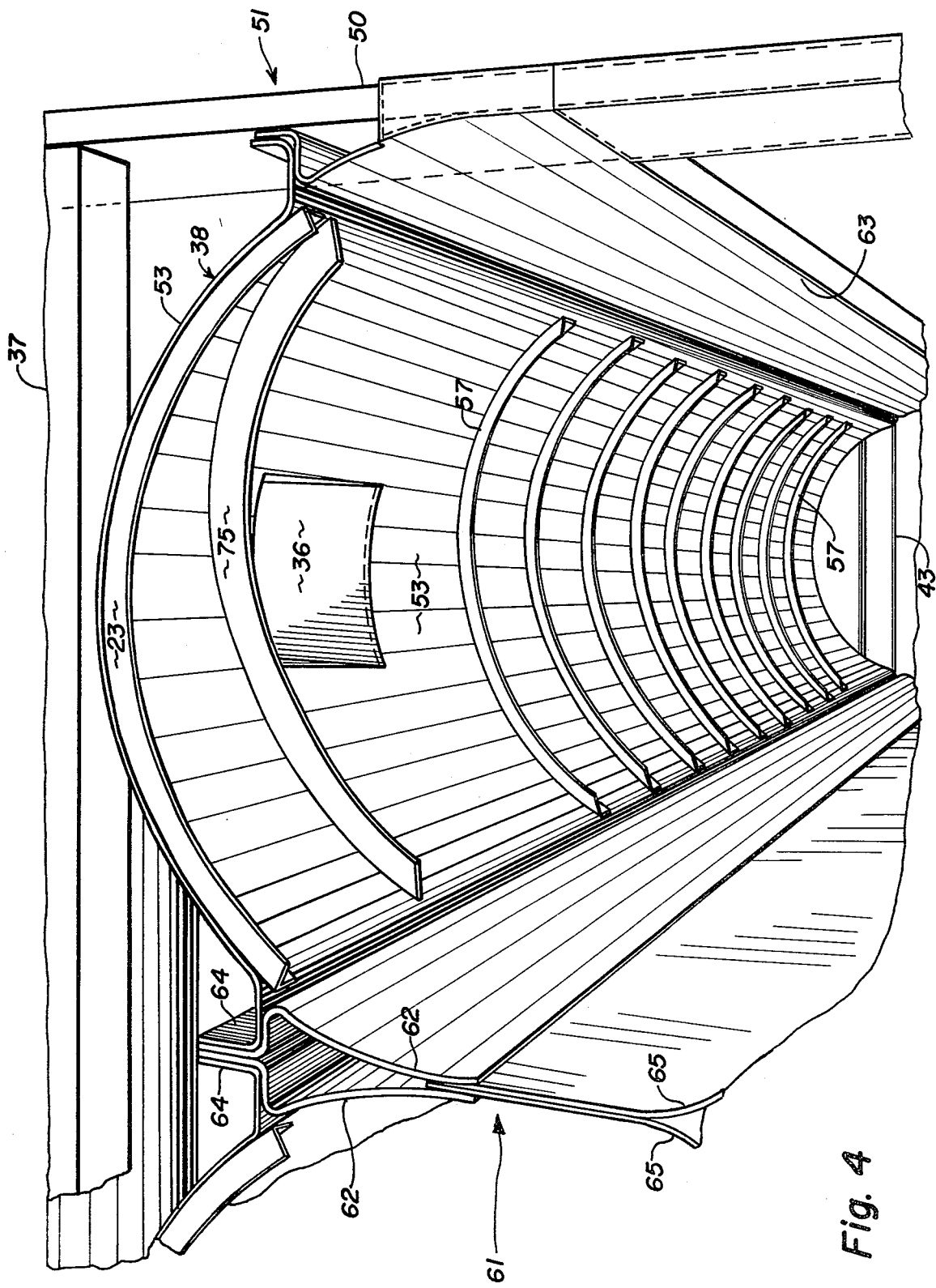
FIG. 4 is an end perspective view of the top of the rotor casing showing the forwardmost transport fin which interacts with the rotor infeed augers.

The rotors 39 are mounted to a pair of stub shafts at their forward and rear ends. The stub shaft at the forward end of each rotor is indicated by the numeral 48 in FIG. 3. The rotors 39 are journalled via their stub shafts within a support member 49 in FIGS. 5-8. The support member 49 extends transversely across the front of the infeed area 40. Via mounting bracket 60 support member 49 is suitably fastened, such as by bolts or welding, to the side channels 50 of the rotor casing module, indicated generally by the numeral 51 and best seen in FIGS. 2 and 6. Mounting bracket 60 is welded to side channel 50 in FIG. 6. Module 51 essentially comprises the supporting framework and the two elongated, generally cylindrical rotor casings 38. As seen in FIG. 4, the module 51 has channel members 37 and 43 transversely supporting the framework at the front and rear portions, respectively. As best seen in FIGS. 5 and 7, each stub shaft 48 is fastened to the rotor 39 in the rotor's generally cylindrical portion 52 which is in the infeed area 17 of the rotor. Stub shaft 48 has a bearing housing 54 which surrounds it and a bearing collar 55 immediately forwardly thereof, as best seen in FIGS. 7 and 8. Bearing housing 54 is fastened to support member 49 by an appropriate number of bolts 56.

Support member 49, as best seen in FIG. 8, has a straight-extending flange portion 58 at the top and a lower flange portion 59 which extends outwardly and then slightly upwardly at the bottom. The lower flange 59 provides a base to which is fastened a rubber strip (not shown) which forms a seal between the infeed housing 16 and the infeed areas 40 and 17 of the rotor casings 38 and rotors 39, respectively.

The individual rotor casings 38 have previously been described as elongate and generally cylindrical in shape. FIGS. 4 and 6 show how the roof 53 of each of the rotor casings 38 has a generally cylindrical form within the rotor casing module 51. A series of truncated arcuate transport fins 57 are affixed to the roof 53 to aid in the rearward spiral movement of the crop material through the casing 38 and about the rotors 39. The fins 57 may be either in the form of L-shaped angle iron strips of metal or simply cross-sectionally rectangular metal strips affixed to the roof 53 at a predetermined angle to the longitudinal axis of the rotor casing 38. Each individual rotor casing 38 is separated along the center line of the module 51 by the casing divider, indicated generally by the numeral 61. Appropriately fastened between the tops of each of the rotor casings 38 are a pair of bracket members 62 which are contiguous at their upper portion between the squared end retaining portions 64 of the tops of rotor casing 38. The sides of bracket member 62 are curved concavely to continue the arc of each rotor casing 38 downwardly from the roof 53. Dividing members 65 are suitably slidably fastened between the bottom portions of bracket members 62 to permit them to move up and down as the concaves are raised and lowered and to complete the arcuate dividing of the two rotor casings 38 into separate and distinct channels. On each of the exterior sides of the module 51 an appropriately curved side sheet 63 continues the arc of the rotor casing 38 downwardly. The generally cylindrical configuration of each of the rotor casings 38 is completed by the aforementioned concaves (not shown) which are generally contiguous with the bottom portions of side sheet 63 and dividing member 65.

The forwardmost portion of the rotor casing 38 has affixed to the underside of the roof 53 a flange member 23, seen in FIG. 4. Flange member 23 serves as a seal against the upper portion of the infeed housing 16 to prevent the escape of crop material from the rotor casing 38 during operation. The bottom portion of the rotor casing module 51 has a curved infeed ramp portion 27 which guides the crop material upwardly from the infeed housing 15 into the individual rotor casings 38 and rotors 39, as seen in FIG. 2. As the crop material moves rearwardly into the casings 38, it is directed inwardly by the arcuate guide members 33 positioned at the lower interior and exterior portions of each of the casings 38.

The improved anti-wrap means of the instant invention is shown partially in FIGS. 6, 7 and 8. As seen in FIG. 6, surrounding each one of the rotor stub shafts 48 and bearing housing 54 is an annular member 66. Projecting outwardly from each of the annular members 66 is a guide member 68. Both the annular members 66 and the guide members 68 are welded to support member 49 and project outwardly therefrom approximately 1¾ inches. Guide member 68 projects from the lower outside portion of each of the annular members approximately at a 45° angle from the horizontal. Guide member 68 is preferably tangential to each annular member 66 although it can project outwardly therefrom in an intersecting relationship with the arc of the annular member 66. Alternatively, the guide member 68 may be wrapped about the bottom of annular member 66 for a distance of approximately an inch to serve as a transition portion. It is essential in any of these configurations that no gap exists between the guide member 68 and the annular member 66 which would permit stems of crop material to be caught therebetween.

The leading edge of the guide member 68 may be beveled to assist the sliding of the crop material stems over and along that edge, although with the preferred tangential relationship between the guide member 68 and the annular member 66 such beveling is not essential. The guide member 68 is designed in height or projection outwardly from the support member 49 sufficiently to just miss the leading edge of the flighting extensions 45 of the rotor flighting 42, best shown in FIG. 2, as the rotors 39 are rotated. This clearance distance between the auger flighting extensions 45 and the guide member 68 is purposefully made as small as possible to reduce the opportunity for crop material to pass over the guide member 68 instead of being guided outwardly and upwardly further back into the rotor casing 38. This clearance is best illustrated in FIGS. 5 and 7.

To assist in conveying the crop material farther back into the rotor casing and, more specifically, into contact with the auger flighting 42, a ramp 69 is used between the guide member 68 and the side channels 50. The ramp 69, seen best in FIGS. 7 and 8, is sloped rearwardly at the top so that it also just clears the auger flighting extensions 45. The ramp 69 is positioned against the lower portion of the support member 49 and then slopes upwardly and then rearwardly approximately two inches so that it guides crop material more deeply into the rotor casing 38 at the top of the support member 49, best seen in FIG. 8. As seen, ramp 69 is appropriately fastened, such as by welding to support member 49. Bracket 71 is in turn at its lower portion secured by suitable means such as a bolt and nut to support plate 60. An end cover plate 72 is suitably fastened, such as by nut and bolt 70, to support bracket 71 at its upper portion and immediately adjacent ramp 69. Cover plate 72 in this manner covers the mounting bolts 74 of FIG. 6 which are used to secure the support member 49 to the side channels 50 via support plate 60. Cover plate 72 is contoured exactly as is ramp 69 so as to provide an uninterrupted surface which will convey crop material upwardly, outwardly and rearwardly to prevent its passing over the top of shaft 48. To further assist in this rearward movement of the crop material after it passes over the ramp 69 and the cover plates 72, a transport fin 75, best seen in FIGS. 4 and 5, is affixed to the rotor casing roof 53. The front and leading edge of the fin 75 is positioned ahead of the rear edge of ramp 69 and the rear end of cover plate 72. Transport fin 75 projects arcuately downwardly approximately one inch from the roof 53. Fin 75 is angled back toward the rear of the rotor casing 38 at an angle that is between approximately 17° and 24° with respect to the support member 49. This positioning and angularization of the fin 75 permits the crop material which is conveyed upwardly, outwardly and rearwardly off the ramp 69 and the covering plate 72 to be caught by the transport fin 75 and conveyed further back into the rotor casing 38 and into the auger flighting 42 of the rotating rotor before it passes over the rotor shaft 48.

In operation the combine 10 moves across a field of crop material where the header 15 gathers crop material and consolidates it. The crop material is transferred from the header upwardly into the infeed area 40 by the crop elevator within the infeed housing 16. Since the crop material is fed into the infeed area 40 from beneath each of the shafts 48, or in an undershot manner, the annular member 66 surrounding each shaft initially functions to prevent crop material from moving upwardly into contact with the rotating shaft 48. Annular member 66 then guides the crop material outwardly around the shaft 48 and generally into contact with the rotor 39. The rotation of the rotor 39 within each rotor casing 38 then starts to impart circumferential motion to the crop material as it is spiralled rearwardly about the rotor 39 within each casing 38. The auger flighting 42 at the very forwardmost portion of the rotor 39 initially engages the crop material and initiates this circumferential motion of the material about the rotor. The rearward spiralling of the auger flighting 42 about the generally cylindrical portion of the rotor 52 causes the crop material to commence rearward movement within the casing 38. As the leading edge of the auger flighting 42 commences moving the crop material outwardly, annular member 66 then further keeps the crop material from contacting the shaft 48 by preventing the material from passing over the top of the stud shaft 48. Guide member 68 projects outwardly from the annular member 66 and, in combination with the ramp 69 and the end cover plates 72, further aids in the outward movement of the crop material away from the longitudinal axis of the rotor 39 and the stub shaft 48. Because of the counter-rotational motion of both of the rotors 39 within the rotor casings 38, the crop material initially is moved generally upwardly as well as outwardly away from the dividing members 65. The slope of the ramp 69 and the end cover plate 72 combine also to move the crop material further into the rotor casing.

Because of the positioning of the transport fins 75 slightly forwardly of the trailing edge of the ramp 69 and the end cover plate 72 the crop material, as it is projected upwardly and outwardly, is brought into contact with the oblique angle of the transport fin. The transport fin 75 projects arcuately downwardly from the roof 53 of the rotor casing 38 just far enough to clear the edges of the auger flighting 42 as the flighting rotates with the rotor 39. This proximal relationship maximizes the amount of material that is retained and guided rearwardly by the transport fin 75.

Additionally, the trialing edges of the annular member 66 and the guide member 68 are projected sufficiently far into the rotor casing 38 that the leading edge of the auger flighting 42 just clears those elements during rotation of the rotor 39. This proximal relationship also permits the maximum engagement of crop material at the earliest point within the rotor casing 38 and minimizes the opportunity for crop material to linger at the forward portion of the rotor casing 38, thereby minimizing the opportunity for crop material to pass over the front of the rotor stub shaft 48 and, in fact, essentially prevents it from occurring.

In this manner, crop material is prevented from wrapping about the front of the rotor at the rotor shaft 48. This crop material, once it is conveyed farther back into the rotor casing 38, is threshed and separated in the appropriate portions of the rotor 39 and rotor casing 38 in a manner that is generally old and well known in the art.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangements of parts which will occur to one of ordinary skill in the art upon a reading of this disclosure.

Having thus described the invention, what is claimed is:

1. In a harvesting and threshing machine for harvesting crop material having:
   (a) a mobile frame;
   (b) material infeed means mounted to the frame;
   (c) drive means mounted to the frame to powder the operational components of the machine;
   (d) a first support means and a second support means both fastened to the frame;
   (e) at least one generally cylindrical elongate casing mounted to the frame in longitudinal axial orientation therewith;
   (f) at least one threshing means adjacent the infeed means rotatably mounted to the first and second support means substantially within the casing, the threshing means having a forward portion with a stub shaft and a rearward portion, the stub shaft connecting the threshing means and the first support means;
   (b) crop material engaging means attached to the front portion of the threshing means and extending outwardly therefrom;
   (h) an annular member fastened to the first support means and surrounding part of the front portion of the threshing means and the stub shaft;
   (i) guide means affixed to the first support means contiguous with and projecting linearly outwardly from the annular member;
   (j) rearwardly sloping ramp means affixed to the first support means adjacent the guide means to direct crop material from the guide means generally outwardly and upwardly from the stub shaft towards the rearward portion; and
   (k) transport means affixed to the casing in oblique relation thereto overlying the crop material engaging means and cooperative therewith during rotation of the threshing means to receive the crop material which is directed outwardly, rearwardly and upwardly by the combined effect of the annular member, the guide means and the ramp means thereby conveying the crop material before it can pass over the stub shaft into material flow communication with the transport means so that the crop material is directed into the crop material engaging means which then rotatively feeds the crop material rearwardly towards the rearward portion of the threshing means.

2. The harvesting and threshing machine according to claim 1 wherein the guide member is aligned generally tangentially to the annular member.

3. The harvesting and threshing machine according to claim 2 wherein the guide member and annular member project approximately 1¾ inches outwardly from the first support means.

4. In a harvesting and threshing machine for harvesting crop material having a mobile frame, at least one threshing means mounted to first support means and second support means on the frame within a generally cylindrical casing and rotatable about a central axis passing through a first shaft and an opposing second shaft, the casing having an inlet end and an outlet end, the first support means being adjacent the inlet end the improvement comprising:

anti-wrap means having a generally annular member surrounding a portion of the shaft with an elongate guide member extending linearly outwardly therefrom a predetermined distance and including ramp means being angled generally rearwardly toward the outlet end fastened to the first support means adjacent the guide member to convey crop material outwardly from the first shaft and away from the inlet end generally toward the outlet end to prevent crop material buildup adjacent the shaft.

5. The harvesting and threshing machine according to claim 4 wherein the guide member is aligned generally tangentially to the annular member.

6. The harvesting and threshing machine according to claim 5 wherein the ramp means further guide the crop material radially outwardly and rearwardly toward the outlet end.

7. The harvesting and threshing machine according to claim 6 wherein the guide member and annular member project approximately 1¾ inches outwardly from the first support means.

8. The harvesting the threshing machine according to claim 4 wherein the casing has affixed thereto a transport means adjacent the inlet end and generally overlying the threshing means in generally oblique relation to the position of the threshing means to convey the crop material from the ramp means generally toward the outlet end.

* * * * *